United States Patent
Elsner et al.

(10) Patent No.: US 9,605,607 B2
(45) Date of Patent: Mar. 28, 2017

(54) METHOD AND DEVICE FOR CONTROLLING A FILLING IN A CYLINDER OF AN INTERNAL COMBUSTION ENGINE

(71) Applicant: Robert Bosch GmbH, Stuttgart (DE)

(72) Inventors: Isabelle Elsner, Esslingen am Neckar (DE); Sven Merkle, Stuttgart (DE); Matthias Pfau, Melningen (DE); Andreas Bethmann, Rutesheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 301 days.

(21) Appl. No.: 14/553,596

(22) Filed: Nov. 25, 2014

(65) Prior Publication Data

US 2015/0144104 A1  May 28, 2015

(30) Foreign Application Priority Data

Nov. 28, 2013 (DE) .................. 10 2013 113 157

(51) Int. Cl.
| | |
|---|---|
| *F01L 1/00* | (2006.01) |
| *F02D 41/00* | (2006.01) |
| *F02D 41/18* | (2006.01) |
| *F02D 13/02* | (2006.01) |
| *F02D 41/10* | (2006.01) |

(52) U.S. Cl.
CPC ..... *F02D 41/0002* (2013.01); *F02D 13/0238* (2013.01); *F02D 41/18* (2013.01); *F01L 2800/00* (2013.01); *F01L 2800/09* (2013.01); *F01L 2800/13* (2013.01); *F02D 41/10* (2013.01); *F02D 2041/001* (2013.01); *F02D 2200/0406* (2013.01);

(Continued)

(58) Field of Classification Search
CPC ............ F01L 2800/00; F01L 2800/09; F01L 2800/13; F02D 41/18; F02D 2200/0406; F02D 2041/001; F02D 2041/002
USPC .......................... 123/90.15–90.18
See application file for complete search history.

(56) References Cited

U.S. PATENT DOCUMENTS

| | | | | |
|---|---|---|---|---|
| 6,390,063 | B1* | 5/2002 | Obata | F01L 9/04 123/399 |
| 2005/0205055 | A1* | 9/2005 | Shimizu | F02D 9/02 123/346 |

* cited by examiner

*Primary Examiner* — Erick Solis
(74) *Attorney, Agent, or Firm* — Norton Rose Fulbright US LLP

(57) ABSTRACT

A method is provided for controlling a filling (rl) of an internal combustion engine (2) including the camshaft phase adjustment in the case of a predefined setpoint filling (rlsol), including the following steps:
- carrying out the filling control based on an indicated pressure difference for obtaining a control variable ($\Lambda_{Fuereg}$) for setting an air mass supply to the internal combustion engine (2); and
- ascertaining the indicated pressure difference ($\Delta p_{SR}$) as a difference between a predicted intake manifold pressure ($p_{srpred}$) and an actual intake manifold pressure ($p_{SR}$), the predicted intake manifold pressure ($p_{srpred}$) corresponding to an intake manifold pressure which is necessary for reaching the setpoint filling (rlsol) at an aspiration curve which is predicted for a predefined time constant ($\tau$).

11 Claims, 3 Drawing Sheets

(52) U.S. Cl.
CPC ....... *F02D 2200/0408* (2013.01); *Y02T 10/18* (2013.01); *Y02T 10/42* (2013.01)

METHOD AND DEVICE FOR CONTROLLING A FILLING IN A CYLINDER OF AN INTERNAL COMBUSTION ENGINE

RELATED APPLICATION INFORMATION

The present application claims priority to and the benefit of German patent application no. 10 2013 113 157.3, which was filed in Germany on Nov. 28, 2013, the disclosure of which is incorporated herein by reference.

FIELD OF THE INVENTION

The present invention relates to internal combustion engines, in particular gasoline engines, the operating states of which are settable by predefining an air filling in the cylinders.

BACKGROUND INFORMATION

In today's engine control units, the air filling in the cylinders of an internal combustion engine is frequently set via a position of the throttle valve. In general, it is assumed that the mass flow through the throttle valve corresponds to the fresh air mass flowing into the cylinder after the buildup of the intake manifold pressure.

Filling controls usually provide that only the mass flow which is stationarily necessary for reaching the setpoint filling is set at the throttle valve. In an intake manifold/time constant which is a function of the construction of the overall system, the intake manifold pressure reaches the desirable setpoint value, or the cylinder filling which is a function thereof reaches the corresponding filling setpoint value. The intake manifold/time constant is a function of an intake manifold volume, an intake manifold temperature, and an engine aspiration curve and may be arithmetically ascertained from a state equation.

Filling controllers for controlling an air filling in the cylinders of an internal combustion engine aim for influencing the time duration up to reaching the intake manifold pressure setpoint value or the cylinder filling setpoint value in such a way that it is minimal. Previous filling controllers are based on using the mass flow at the throttle valve as a measure for the cylinder filling, which is, however, imprecise since the decisive variable for the cylinder filling, namely the intake manifold pressure during the closure of the inlet valve, is ignored. This means that when the mass flow at the throttle valve is set above or below the stationary setpoint value in a targeted manner, an intake manifold pressure build-up or reduction and thus a filling build-up or reduction may be accelerated. For this purpose, a differential state equation is set up for the time during which the pressure build-up is to take place, a simplification being carried out according to which the instantaneous aspiration value corresponds to the setpoint aspiration value and the instantaneous residual gas quantity corresponds to the setpoint residual gas quantity.

In engines in which the camshaft phase adjustment has a great influence on the aspiration curve of the internal combustion engine, such a simplification is not admissible, however. If the camshaft is in fact adjusted in the case of a simplified procedure, e.g., in the case of a constant filling request, the aspiration behavior changes and therefore the filling. In the current concept, the filling controller is, however, configured in such a way that it may only intervene if the air filling deviates from the setpoint air filling.

SUMMARY OF THE INVENTION

According to the present invention, a method for controlling an air filling in a cylinder of an internal combustion engine is provided according to the description herein, and the device, the engine system, and the computer program product are provided according to the further descriptions herein.

Additional embodiments are described in the further descriptions herein.

According to one first aspect, a method is provided for controlling a filling of an internal combustion engine including the camshaft phase adjustment in the case of a predefined setpoint filling, including the following steps:

carrying out the filling control based on an indicated pressure difference for obtaining a control variable for setting an air mass supply to the internal combustion engine; and ascertaining the indicated pressure difference as a difference between a predicted intake manifold pressure and an actual intake manifold pressure, the predicted intake manifold pressure corresponding to an intake manifold pressure which is necessary for reaching the setpoint filling at an aspiration curve which is predicted for a predefined time constant.

A filling controller for an internal combustion engine in general receives, as an input variable, an indicated pressure difference regarding the difference between the setpoint intake manifold pressure and the actual intake manifold pressure and generates, inter alia, a corresponding control variable which is a function of a predefined setpoint filling and which indicates an adjustment. If an adjustment of the camshaft phase adjuster takes place, the setpoint intake manifold pressure has been ascertained so far from the setpoint position of the camshaft phase adjuster to be approached, which may result in a strong overshooting of the filling controller during a camshaft phase adjustment.

One idea of the method described above is making available to the filling controller an indicated pressure difference, as the input variable, which indicates a difference, e.g., a difference between an intake manifold pressure necessary to reach the setpoint filling which arises at the aspiration curve predicted for the desirable time constant, and the actual intake manifold pressure. For this purpose, it is necessary to ascertain a predicted aspiration curve and a predicted residual gas quantity for each control cycle, the prediction being carried out for a time horizon which corresponds to an adjustment period of the filling controller. The prediction aims to establish the predicted aspiration curve as a function of a predicted position of the camshaft phase adjuster after the certain time duration.

In this way, a method for controlling the filling may be provided which makes available satisfactory control of the filling even in the case of a camshaft phase adjustment.

By modifying the filling control in such a way that only the input variable of the filling control is modified as a function of an aspiration behavior which changes as a result of a camshaft phase adjustment, it is easily made possible to also use a filling controller in internal combustion engines which include a camshaft phase adjustment.

Furthermore, it may be provided that the indicated pressure difference is ascertained as a pressure difference.

It may be provided that at least one ascending slope of the predicted aspiration curve based on a predicted camshaft phase adjustment is adapted which is ascertained, in particular, by taking into consideration the camshaft adjustment speed as a change during a cycle time duration which is determined by the predefined time constant.

According to one specific embodiment, the ascending slope of the aspiration curve may be ascertained based on a relationship between the volumes of the combustion chamber at the point in time of closure of an inlet valve of a cylinder of the internal combustion engine during the predicted and an instantaneous camshaft phase adjustment.

It may be provided that a residual gas quantity is adapted as an offset of the predicted aspiration curve based on a predicted camshaft phase adjustment, the predicted residual gas quantity (indicated with the aid of the pressure of the residual gas quantity) being ascertained during an instantaneous and the predicted camshaft phase adjustment at the point in time of closure of an inlet valve of a cylinder of the internal combustion engine.

Furthermore, the predicted intake manifold pressure may be ascertained from the predicted aspiration curve and the predefined setpoint filling.

According to another aspect, a device is provided for controlling a filling of an internal combustion engine including the camshaft phase adjustment in the case of a predefined setpoint filling, the device being configured for:
carrying out the filling control based on an indicated pressure difference for obtaining a control variable for setting an air mass supply to the internal combustion engine; and
ascertaining the indicated pressure difference as a difference between a predicted intake manifold pressure and an actual intake manifold pressure, the predicted intake manifold pressure corresponding to an intake manifold pressure which is necessary for reaching the setpoint filling at an aspiration curve which is predicted for a predefined time constant.

According to another aspect, a computer program product is provided, which contains a program code which carries out the above-described method when it is executed on a computing device, in particular on the above-described device.

Specific embodiments of the present invention are explained in greater detail below on the basis of the accompanying drawings.

DETAILED DESCRIPTION

Figure 1:
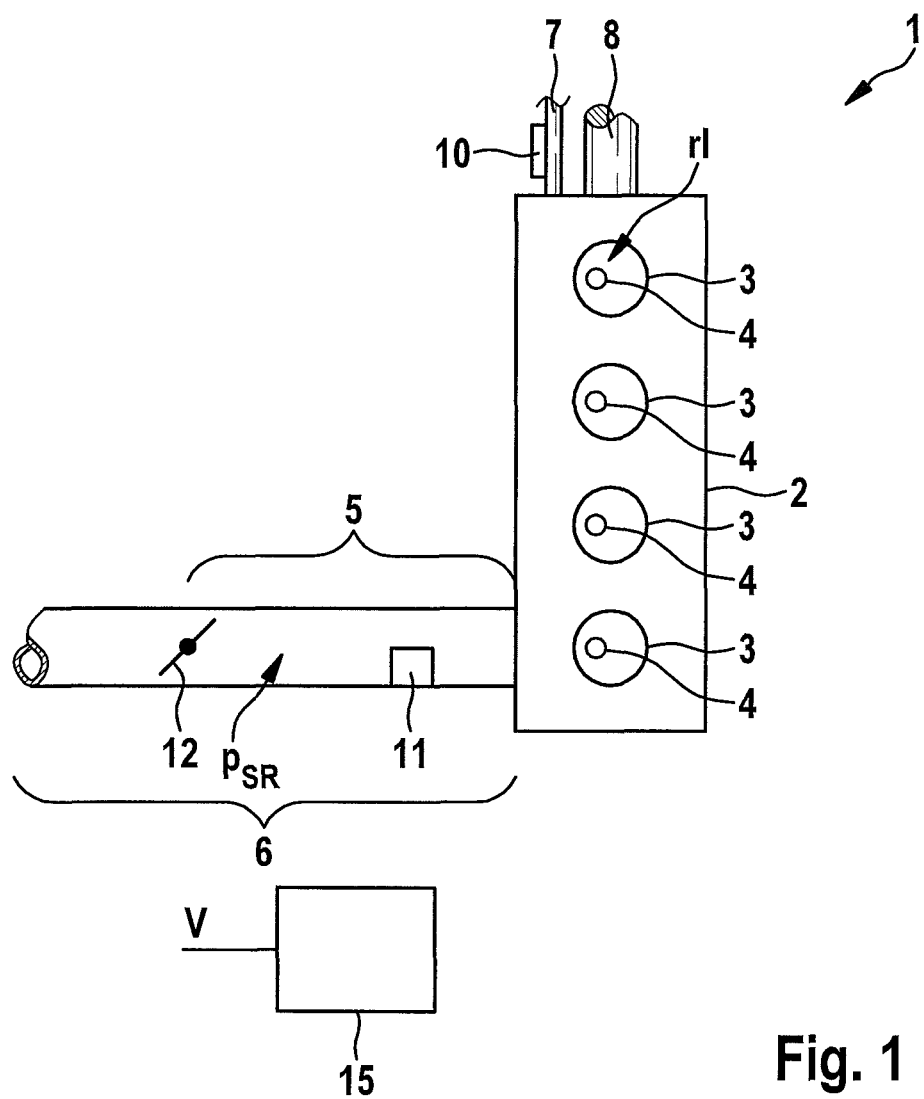
FIG. 1 shows a schematic representation of an engine system having an internal combustion engine.

FIG. 1 schematically shows a representation of an engine system 1 including an internal combustion engine 2, in particular a gasoline engine which has multiple, in the exemplary embodiment shown four, cylinders 3. Cylinders 3 are provided with inlet valves 4 via which air may be let in cyclically from an intake manifold section 5 of an air supply system 6 into cylinders 3 according to a combustion cycle of the particular cylinder of the internal combustion engine.

Inlet valves 4 are coupled to a camshaft 7 which is driven by a crankshaft 8 of internal combustion engine 2. The inlet valves are activated by a rotation of camshaft 7 so that they open and close according to a lift curve as a function of a crankshaft angle of crankshaft 8.

Furthermore, a camshaft phase adjustment unit 10 is provided, with the aid of which it is possible to adjust in a controlled manner the opening and closing times of inlet valves 4, i.e., their phase positions, with respect to the position of the rotation angle of crankshaft 8, i.e., as a function of the particular phase position of the pistons in cylinders 3.

A camshaft phase adjustment refers to a process for changing the control times of the valve control of gasoline engines during operation. In this case, the length of the lift curve (with reference to the crankshaft angle) of the valve in question is not changed, but its phase position is merely adapted with regard to the crankshaft angle. The adaptation of the opening and closing times of the inlet and outlet valves allows the efficiency of the internal combustion engine to be increased as a function of the particular load behavior. The increase may become apparent in the form of performance or torque gain or fuel savings.

The entire air which flows through inlet valves 4 into cylinders 3 is made available via intake manifold section 5. The amount of air which flows through inlet valves 4 into cylinders 3 is identified by filling rl and is predominantly determined through actual intake manifold pressure $p_{SR}$ in intake manifold section 5 at the point in time of closure of inlet valves 4. Actual intake manifold pressure $p_{SR}$ may be measured with the aid of an intake manifold pressure sensor 11 or modeled based on other system variables with the aid of an intake manifold pressure model.

To influence intake manifold pressure $p_{SR}$, a throttle valve 12 is situated in air supply system 6 whose position, in particular whose angle position DW, determines a flow resistance in air supply system 6 and may thus predominantly set intake manifold pressure $p_{SR}$.

A control unit 15 is provided which controls the operation of internal combustion engine 2 by activating the actuators, such as the throttle valve, camshaft phase adjuster 10, injectors for injecting fuel, and the like.

In control unit 15, a filling control is implemented which predefines, as a function of a predefined load V, a setpoint filling rlsol for cylinders 3 which is to be reached as fast as possible by the filling control.

For a conventional filling control, the following applies:

$$p_{SR} \cdot V = m \cdot R \cdot T$$

$$\frac{dp_{SR}}{dt} \cdot V = \frac{dm}{dt} \cdot R \cdot T$$

where:

$$\frac{dm}{dt} = f(msdk, psr, pbrint, fupsrl, umsrl)$$

resulting in $$\frac{dp_{SR}}{dt} \frac{V}{R \cdot T} = f(msdk, p_{SR}, pbrint, fupsrl, umsrl)$$

where $p_{SR}$ indicates the intake manifold pressure, V indicates the intake manifold volume, R indicates the gas constant, T indicates the air temperature in the intake manifold, m indicates an air mass, dm/dt indicates an air mass flow, msdk indicates an air mass flow via throttle valve 12, pbrint indicates a pressure of the residual gas in cylinder 3, fupsrl indicates an ascending slope of an aspiration curve of internal combustion engine 2, fupsrls indicates a setpoint value of the ascending slope of an aspiration curve of internal combustion engine 2, pbrints indicates a setpoint value of a pressure of the residual gas in cylinder 3, and umsrln indicates a predefined conversion factor.

The intervention of the filling control is based on an adjustment of throttle valve 12, actuating angle $\Lambda_{Fuereg}$ for throttle valve 12 being obtained as follows:

$$\Lambda_{Fuereg}=(rlsol-rl)\cdot g(V,R,T,fupsrl,umsrln,p_{SR},$$

where rlsol indicates a filling setpoint value, rl indicates a filling, $\Lambda_{Fuereg}$ indicates the actuating angle for throttle valve 12 as a control variable of the filling control, and g( ) indicates an imaging function.

Since, however, the camshaft phase adjustment has a great influence on the aspiration curve of internal combustion engine 2, basing the filling control on the simple difference between setpoint intake manifold pressure $p_{SRsol}$ and actual intake manifold pressure $p_{SR}$ is imprecise. In the case of a constant filling request, the filling controller would only intervene in the event of an adjustment of the phase angle of camshaft 7 if actual filling rl deviated from setpoint filling rlsol, which should, however, be prevented by the filling controller. In the case of a camshaft 7 which is adjusting very slowly or not at all, the filling controller would respond prematurely or excessively strongly, thus resulting in a filling overshooting or a filling undershooting. Therefore, the simplification described above in the event of taking into consideration the aspiration behavior based on the setpoint value of the phase position of camshaft 7 is, however, not admissible in internal combustion engines in which the camshaft phase adjustment has a great influence on the aspiration curve.

By ignoring the above-described simplification, it is possible to prevent the deviation of actual filling rl from setpoint filling rlsol.

In order to operate the filling controller by taking into consideration a changing aspiration curve, an adapted indicated pressure difference must be used instead of the indicated pressure difference for the pressure difference between the setpoint intake manifold pressure and the actual intake manifold pressure of the conventional filling controller.

Figure 2:
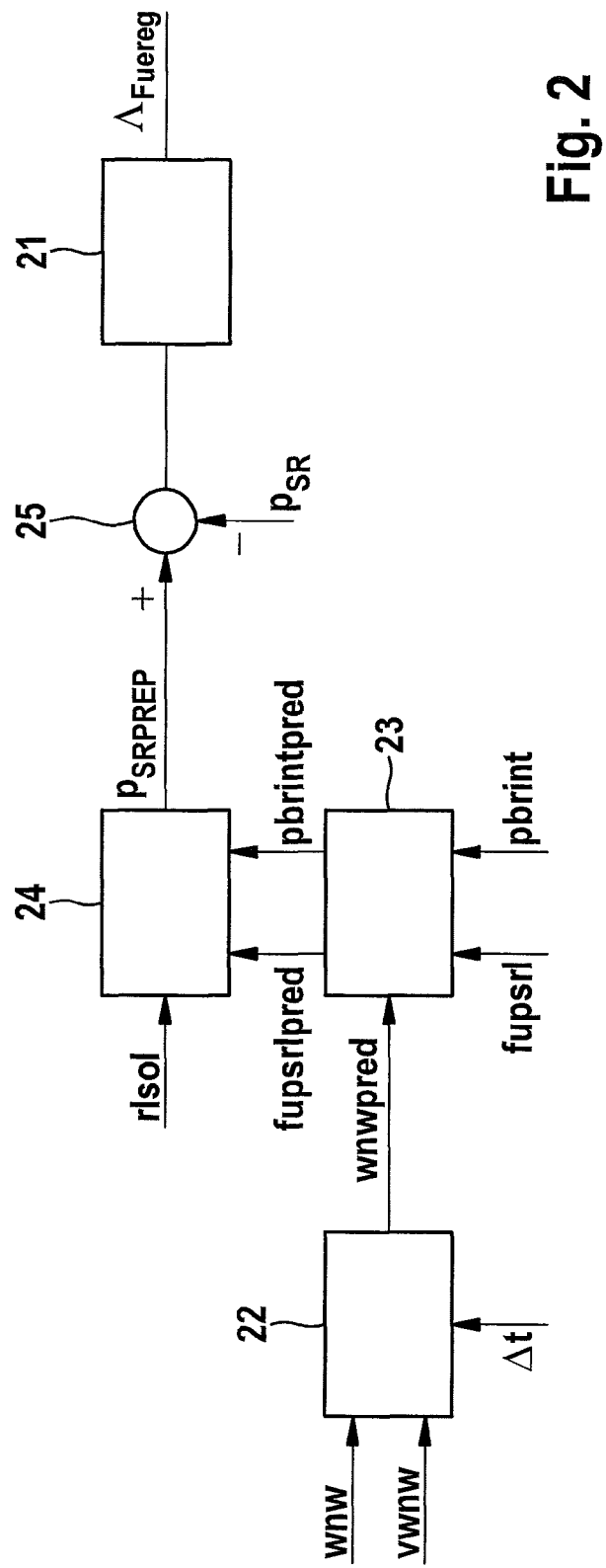
FIG. 2 shows a function diagram to illustrate how a filling control is carried out in an engine system according to FIG. 1.

The filling control is described in the following in greater detail with reference to the function diagram of FIG. 2.

Setpoint intake manifold pressure $p_{SRsol}$ is computed to obtain:

$$p_{SRsol} = \frac{rlsol}{fupsrls} + pbrints$$

The above-mentioned formula does, however, not take into consideration the change in the actual control time which is necessary for the coordination, so that it is provided that pbrints and fupsrls describe the engine aspiration curve for a new setpoint control time.

For this purpose, the aspiration curve must be predicted for a time horizon which corresponds to the adjustment period of a filling controller 21, i.e., its time constant. For this purpose, it is necessary to predict the position of camshaft 7 at this point in time.

The predicted camshaft phase adjustment is determined in a camshaft actuating unit 22 and may be ascertained from a predefined equation of motion which is known per se and which is based on instantaneous camshaft phase position (camshaft angle) wnw and the product of camshaft adjustment speed vwnw and prediction horizon $\Delta t$, wnwpred corresponding to the predicted camshaft phase adjustment, wnw corresponding to the camshaft phase adjustment, and vwnw corresponding to the camshaft phase adjustment speed.

Here, it must be taken into consideration that camshaft 7 cannot be adjusted beyond its mechanical stops. The ascertainment of camshaft adjustment speed vwnw may take place as usual from the change in instantaneous camshaft angle $wnw_{new}$-$wnw_{old}$ per computation grid.

If the detection of the camshaft phase adjustment is disrupted by noise, the resulting speed may be filtered with the aid of a low-pass filter, for example. The filtering may additionally be implemented in such a way that in the case of an in fact high camshaft adjustment speed, a low filtering intervention is carried out, and in the case of a quasi-stationary operation, a high filtering intervention is carried out.

If camshaft 7 is adjusted out of a resting position, a down time results between the output of the setpoint value and the actual movement of camshaft 7. If, despite a movement of camshaft 7, the above-described method for ascertaining the camshaft adjustment speed ascertained an adjustment speed of 0, the adjustment speed of camshaft 7 should be modeled with the aid of a camshaft model during the down time.

To compute the predicted aspiration curve in aspiration curve adaptation block 23, in principle, the possibility exists of computing the filling detection again for the predicted camshaft phase adjustment. Since prediction horizon $\Delta t$ is, however, relatively long (typically 50 milliseconds to 500 milliseconds), an approximate computation is sufficient. Ascending slope fupsrl of the engine aspiration curve, which is assumed to be linear, for example, changes in relation to the cylinder volume at the point in time of closure of inlet valve 4 between instantaneous and predicted camshaft phase adjustment wnw, wnwpred:

$$fupsrlpred=h(fupsrl,FVBR(wnwpred),FVBR(wnw))$$

where FVBR corresponds to the combustion chamber volume at a certain camshaft phase adjustment wnwpred, wnw; h( ) corresponds to a predefined computation specification; and fupsrlpred corresponds to the ascending slope of the predicted aspiration curve.

Assuming that not the residual partial pressure, but the residual gas content, remains approximately constant, it is possible to compute a predicted residual partial pressure pbrintpred:

$$pbrintpred=j(pbrint,FVBR(wnwpred),FVBR(wnw))$$

using a predefined computation specification j( ).

The predicted setpoint intake manifold pressure then results in intake manifold pressure adaptation block 24 based on the aspiration curve.

$$p_{srpred}=k(rlsol,fupsrlpred,pbrintpred)$$

using a predefined aspiration curve function k( ).

Predicted air filling rlpred is computed from predicted actual intake manifold pressure $p_{srpred}$ and the predicted aspiration curve. The time horizon is in this case the interval between carrying out the computation of predicted air filling rlpred and the point in time of closure of inlet valve 4. For this time horizon, a predicted camshaft angle is computed again with the aid of the camshaft adjustment speed.

Control variable $\Lambda_{Fuereg}$ may be ascertained therefrom at any computing point in time as follows:

$$\Lambda_{Fuereg}=r(\tau,\Delta p_{SR},\cdot V,R\cdot T,rlpred,rl,umsrln)$$

where:

$$\Delta p_{SR}=p_{srpred}-p_{SR},$$

where r( ) corresponds to a predefined control variable function. Indicated pressure difference $\Delta P_{SR}$ may be ascertained from a difference computation $p_{srpred}-p_{SR}$ in a difference element 25.

To coordinate the overall system, it may be necessary to filter the setpoint values of camshaft 7 despite the P-based filling controller when the adjustment of camshaft 7 changes the filling to a greater extent than that which throttle valve 12 is capable of responding to in the fastest possible case.

Figure 3:
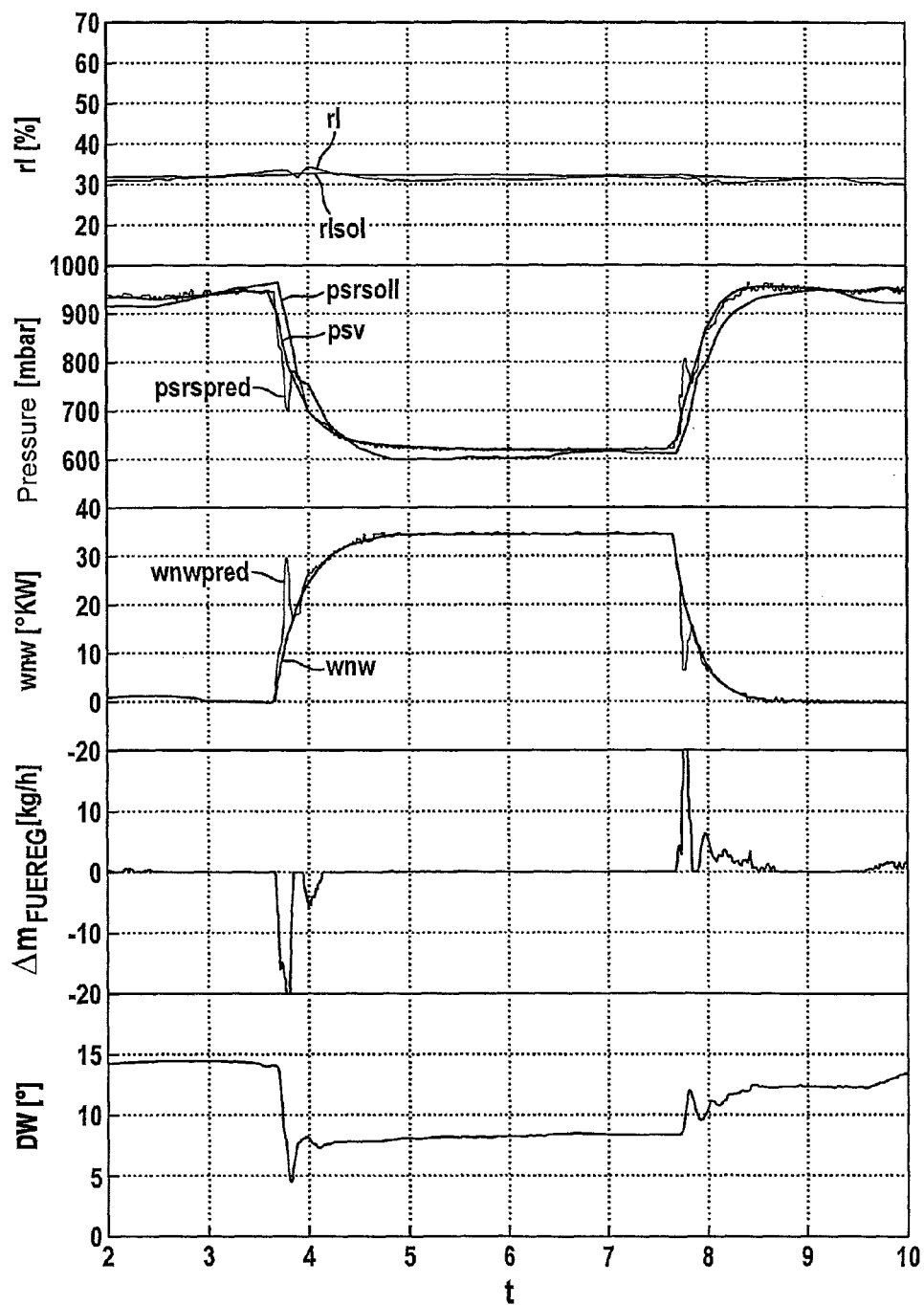
FIG. 3 shows time curve diagrams to illustrate the profiles of the state variables during two load changes.

FIG. 3 shows time curve diagrams to illustrate the time profiles of the state variables during two load changes. The profiles of the variables air filling rl, intake manifold pressure $p_{SR}$, camshaft position wnw, control variable $\Lambda_{Fuereg}$ of the filling controller, and throttle valve angle DW are apparent over time t.

What is claimed is:

1. A method for controlling a filling of an internal combustion engine including a camshaft phase adjustment for a predefined setpoint filling, the method comprising:
    carrying out the filling control based on an indicated pressure difference for obtaining a control variable for setting an air mass supply to the internal combustion engine; and
    ascertaining the indicated pressure difference as a difference between a predicted intake manifold pressure and an actual intake manifold pressure, the predicted intake manifold pressure corresponding to an intake manifold pressure which is necessary for reaching the setpoint filling at an aspiration curve which is predicted for a predefined time constant.

2. The method of claim 1, wherein the indicated pressure difference is ascertained as a pressure difference.

3. The method of claim 1, wherein at least one ascending slope of the predicted aspiration curve based on a predicted camshaft phase adjustment is adapted which is ascertained.

4. The method of claim 3, wherein an ascending slope of the aspiration curve is ascertained based on a relation between the volumes of the combustion chamber at the point in time of closure of an inlet valve of a cylinder of the internal combustion engine during the predicted and an instantaneous camshaft phase adjustment.

5. The method of claim 3, wherein a residual gas quantity is adapted as an offset of the predicted aspiration curve based on a predicted camshaft phase adjustment, a predicted residual gas quantity being ascertained during an instantaneous and the predicted camshaft phase adjustment at the point in time of closure of an inlet valve of a cylinder of the internal combustion engine.

6. The method of claim 1, wherein the predicted intake manifold pressure is ascertained from the predicted aspiration curve and the predefined setpoint filling.

7. A device for controlling a filling of an internal combustion engine having a camshaft phase adjustment in the case of a predefined setpoint filling, comprising:
    an arrangement configured for:
        performing the filling control based on an indicated pressure difference for obtaining a control variable for setting an air mass supply to the internal combustion engine; and
        ascertaining the indicated pressure difference as a difference between a predicted intake manifold pressure and an actual intake manifold pressure, the predicted intake manifold pressure corresponding to an intake manifold pressure which is necessary for reaching the setpoint filling at an aspiration curve which is predicted for a predefined time constant.

8. A computer readable medium having a computer program, which is executable by a processor, comprising:
    a program code arrangement having program code for controlling a filling of an internal combustion engine including a camshaft phase adjustment for a predefined setpoint filling, by performing the following:
        performing the filling control based on an indicated pressure difference for obtaining a control variable for setting an air mass supply to the internal combustion engine; and
        ascertaining the indicated pressure difference as a difference between a predicted intake manifold pressure and an actual intake manifold pressure, the predicted intake manifold pressure corresponding to an intake manifold pressure which is necessary for reaching the setpoint filling at an aspiration curve which is predicted for a predefined time constant.

9. The electronic storage medium of claim 8, wherein the indicated pressure difference is ascertained as a pressure difference.

10. An electronic control unit, comprising:
    an electronic storage medium having a computer program, which is executable by a processor, including a program code arrangement having program code, by performing the following:
        performing the filling control based on an indicated pressure difference for obtaining a control variable for setting an air mass supply to the internal combustion engine; and
        ascertaining the indicated pressure difference as a difference between a predicted intake manifold pressure and an actual intake manifold pressure, the predicted intake manifold pressure corresponding to an intake manifold pressure which is necessary for reaching the setpoint filling at an aspiration curve which is predicted for a predefined time constant.

11. The method of claim 1, wherein at least one ascending slope of the predicted aspiration curve based on a predicted camshaft phase adjustment is adapted which is ascertained by taking into consideration a camshaft adjustment speed as a change during a cycle time duration which is determined by the predefined time constant.

* * * * *